United States Patent [19]

Kato

[11] Patent Number: 4,620,246
[45] Date of Patent: Oct. 28, 1986

[54] CASSETTE EJECTION MECHANISM OF A CASSETTE TAPE RECORDER

[75] Inventor: Toshikazu Kato, Tokyo, Japan

[73] Assignee: Olympus Optical Co., Ltd., Tokyo, Japan

[21] Appl. No.: 403,865

[22] Filed: Jul. 30, 1982

[30] Foreign Application Priority Data

Aug. 12, 1981 [JP] Japan .................. 56-126362

[51] Int. Cl.$^4$ .......................................... G11B 15/00
[52] U.S. Cl. .................................... 360/96.5; 360/93
[58] Field of Search ............... 360/71, 90, 93, 96.5, 360/96.6, 105, 137, 96.1; 242/198–200

[56] References Cited

U.S. PATENT DOCUMENTS

| | | | |
|---|---|---|---|
| 3,987,486 | 10/1976 | Ito et al. | 360/96.5 |
| 4,071,859 | 1/1978 | Sami | 360/96.5 |
| 4,159,495 | 6/1979 | Tsutsumi | 360/96.5 |
| 4,163,997 | 8/1979 | Sugihara | 360/96.5 |
| 4,301,485 | 11/1981 | Takanashi | 360/96.5 |
| 4,377,829 | 3/1983 | Kamimura et al. | 360/96.6 |

FOREIGN PATENT DOCUMENTS 50-4136  2/1975  Japan .

Primary Examiner—Stuart N. Hecker
Assistant Examiner—David J. Severin
Attorney, Agent, or Firm—Frishauf, Holtz, Goodman & Woodward

[57] ABSTRACT

A cassette ejection mechanism includes an ejecting plate movably attached to a guide plate and having a pressing element for pressing a magnetic head and a pinch roller, a boosting plate movably attached to the guide plate, and a stop member attached to the guide plate so as to be able to engage the boosting plate to lock the same. After the magnetic head and pinch roller are moved by the pressing element to positions where they do not hinder the movement of a cassette holder, the stop member is pressed by the pressing element to be disengaged from the boosting plate. The boosting plate is urged by an urging element stretched between the ejecting plate and boosting plate to move the cassette holder from its lower position to its upper position.

5 Claims, 11 Drawing Figures

CASSETTE EJECTION MECHANISM OF A CASSETTE TAPE RECORDER

BACKGROUND OF THE INVENTION

This invention relates to a cassette ejection mechanism of a cassette tape recorder.

Generally known is the so-called slot-in-type cassette tape recorder in which a tape cassette inserted in a cassette holder slides nearly horizontally therein, and then descends together with the holder to be located automatically in a position for playback operation. In ejecting the cassette from such a slot-in-type tape recorder, the cassette, along with the cassette holder, is raised from the position for playback operation, and then slides nearly horizontally in the cassette holder to be ejected. At the cassette ejection, a magnetic head and pinch roller are moved to positions where they do not hinder the ascending motion of the cassette holder. The movement of the magnetic head and pinch roller, the ascending motion of the cassette holder, and the sliding motion of the tape cassette are all achieved by means of an ejecting plate. In general, the ejecting plate is so arranged as to be movable between first and second positions. The stroke of movement of the ejecting plate from the first position to the second position is called a push-in stroke. In the first half of the push-in stroke, the ejecting plate moves the magnetic head and pinch roller to the positions where they do not hinder the ascending motion of the cassette holder. In the latter half, the cassette holder is raised. The stroke of movement of the ejecting plate from the second position to the first position, on the other hand, is called a return stroke. In the return stroke, the ejecting plate slides the tape cassette to eject it. Thus, the ejecting plate moves the magnetic head and pinch roller in the first half of its push-in stroke and raises the cassette holder in the latter half, so that the push-in stroke of the ejecting plate need be relatively long. If the push-in stroke were long, however, the tape recorder would be increased in size and reduced in operating efficiency.

SUMMARY OF THE INVENTION

This invention is contrived in consideration of these circumstances, and is intended to provide a cassette ejection mechanism for a cassette tape recorder capable of reliable tape cassette ejection using an ejecting plate with a relatively short push-in stroke.

According to one aspect of the invention, there is provided a cassette ejection mechanism which comprises an ejecting plate attached to a guide plate of a cassette tape recorder to be movable between first and second positions, whereby a magnetic head and a pinch roller of the cassette tape recorder are moved to the positions where they do not hinder the movement of a cassette holder of the tape recorder as the ejecting plate moves from the first position to the second position, and whereby a tape cassette in the cassette holder is slid to be ejected as the ejecting plate moves from the second position to the first position, a boosting plate attached to the guide plate to be movable between first and second positions, whereby the cassette holder is moved from a lower position to an upper position thereof as the boosting plate moves from the first position to the second position thereof, an urging means stretched between the ejecting plate and the boosting plate, whereby the boosting plate is urged to move from the first position to the second position thereof as the ejecting plate moves from the first position to the second position thereof, and a stop member attached to the guide plate to be able to engage the boosting plate, thereby locking the boosting plate to the first position thereof. The ejecting plate includes pressing means for pressing the stop member to disengage the stop member from the boosting plate when the movement of the ejecting plate from the first position to the second position thereof is ended. According to the ejection mechanism of the invention, the magnetic head and the pinch roller are moved to positions where they do not hinder the movement of the cassette holder as the ejecting plate moves from the first position to the second position thereof. In the meantime, the boosting plate is locked to its first position by the stop member while it is urged toward its second position by the urging means. When the transfer of the ejecting plate from the first position to the second position thereof is ended, the pressing means of the ejecting plate presses the stop member to disengage the same from the boosting plate. As a result, the boosting plate is moved from the first position to the second position thereof by the urging force of the urging means, thereby moving the cassette holder from the lower position to the upper position thereof. Thereafter, as the ejecting plate moves from the second position to the first position thereof, the tape cassette slides in the cassette holder to be ejected. Thus, according to this ejection mechanism, the push-in stroke of the ejecting plate, that is, the stroke of transfer from the first position to the second position thereof, need only be long enough to allow the magnetic head and the pinch roller to move to the positions where they do not hinder the movement of the cassette holder, so that it is unnecessary to provide an additional transfer stroke for the movement of the cassette holder. According to this ejection mechanism, therefore, the push-in stroke of the ejecting plate may be reduced nearly to half that of the ejecting plate of the conventional ejection mechanism. Further, the cassette holder is transferred by the boosting plate after the magnetic head and the pinch roller are shifted securely by the ejecting plate. Accordingly, the movement or transfer of the cassette holder would never be prevented by the magnetic head or the pinch roller, and the tape cassette can be ejected with reliability.

BRIEF DESCRIPTION OF THE DRAWINGS

FIGS. 4, 5, 6, 8 and 9 show several components of the cassette tape recorder, in which FIG. 4 is a side view of a cassette holder, FIG. 5 is a side view of a guide plate, FIG. 6 is a side view of an ejecting plate, FIG. 8 is a side view showing a boosting plate and a stop member, and FIG. 9 is a side view of a coupling plate;

DETAILED DESCRIPTION OF THE PREFERRED EMBODIMENT

There will now be described in detail an embodiment of this invention with reference to the accompanying drawings.

Figure 1:
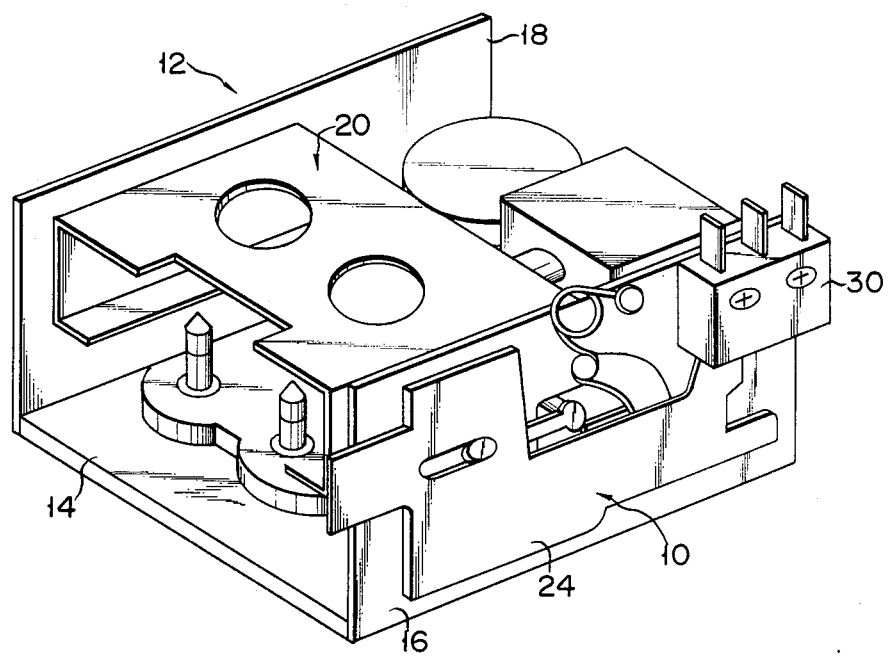
FIG. 1 is a perspective view of a cassette tape recorder with a cassette ejection mechanism according to an embodiment of this invention.
Figure 2:
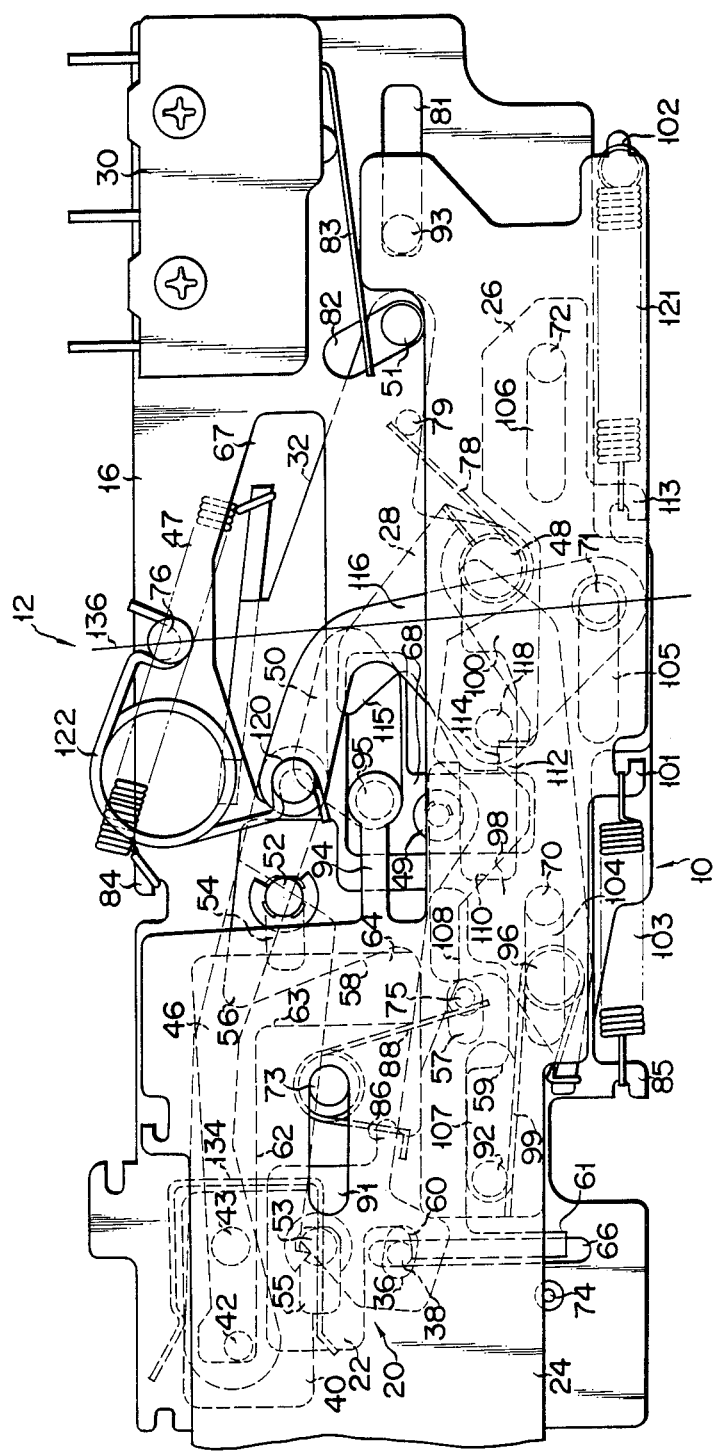
FIGS. 2 and 3 are right and left side views, respectively, of the cassette tape recorder before tape cassette insertion.
Figure 3:
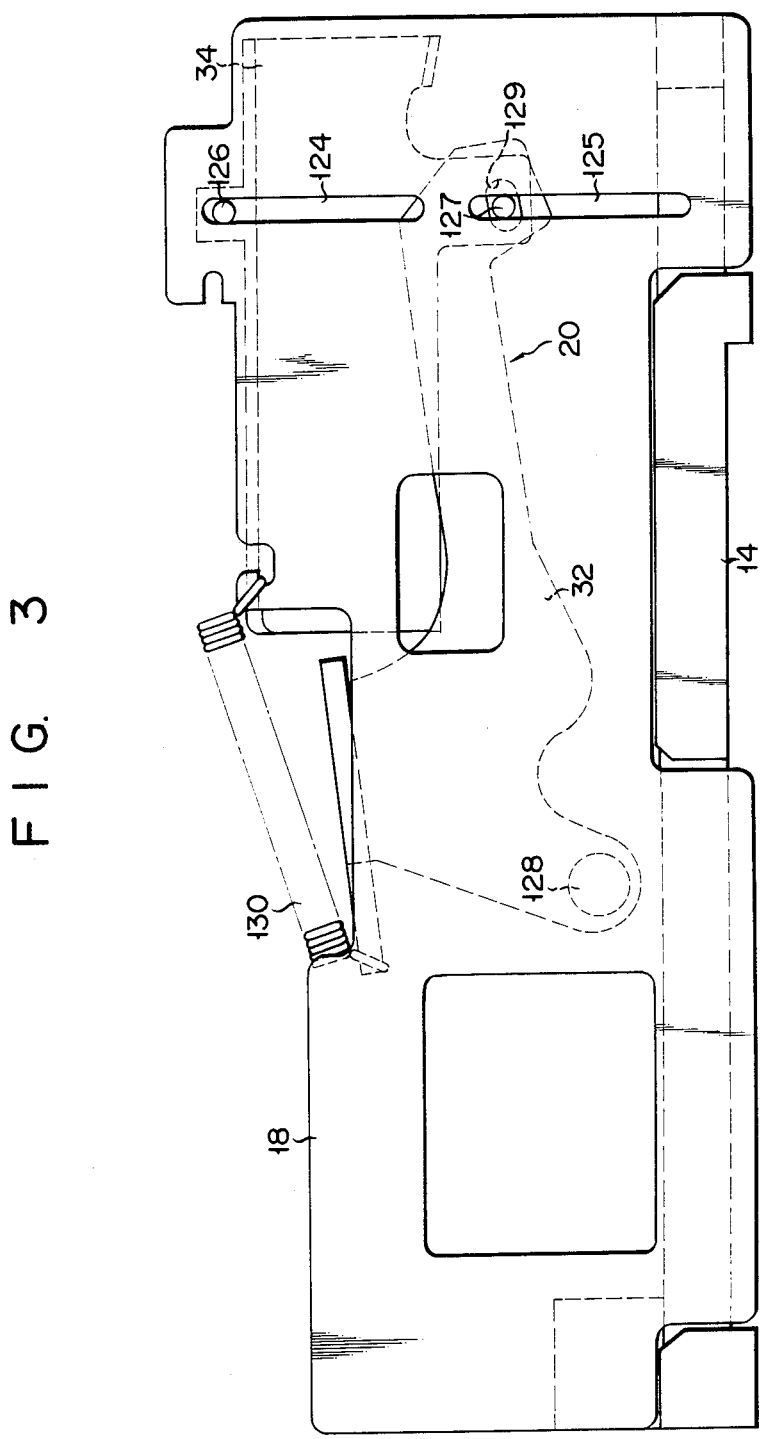

First, an outline of this invention will be explained. As shown in FIGS. 1 to 3, a cassette tape recorder 12 with a cassette ejection mechanism 10 comprises a base 14 and a pair of guide plates 16 and 18 attached to both sides, respectively, of the base 14 so as to face each other. The base 14 and the guide plates 16 and 18 constitute the chassis of the cassette tape recorder 12. Over the base 14 a cassette holder 20 is disposed between the guide plates 16 and 18. The cassette holder 20 is supported by the guide plates 16 and 18 so as to be movable between an upper position and a lower position. As seen from FIG. 2, the ejection mechanism 10 is provided with an ejecting plate 24, a boosting plate 26, and a stop member 28. The ejecting plate 24 is attached to the guide plate 16 so as to be able to slide horizontally. Thus, the ejecting plate 24 is kept off and outside the guide plate 16 and a lock plate 22 attached to the guide plate 16. The boosting plate 26 is attached to the inner surface of the guide plate 16 so as to be able to slide horizontally, extending parallel to the ejecting plate 24. The stop member 28 is rockingly attached to the inner surface of the guide plate 16, and is so arranged as to be able to engage the boosting plate 26. Further, a main switch 30 for the cassette tape recorder 12 is attached to the outer surface of the rear end of the guide plate 16.

The cassette holder 20 is locked by the lock plate 22 to be normally located in the upper position shown in FIG. 2. If a cassette (not shown) is inserted and pushed fully into the cassette holder 20, the cassette holder 20 is lowered automatically, guided by the guide plates 16 and 18. Then, the cassette holder 20 is locked to its lower position by the lock plate 22. As the cassette holder 20 is lowered, the main switch 30 is turned on. The moment the cassette holder 20 is set in the lower position, a pinch roller lever and a head lever arranged on the base 14 move to bring a pinch roller and a head (not shown), respectively, into contact with a tape, thereby starting playback operation automatically. If the ejecting plate 24 in a first position shown in FIG. 2 is fully pushed in, the cassette holder 20 in the lower position is forced up by the boosting plate 26. Then, the cassette holder 20 is locked to its upper position by the lock plate 22 to allow cassette ejection. As the ejecting plate 24 slides, the pinch roller lever and the head lever move to separate the pinch roller and the head, respectively, from the tape. As the cassette holder 20 rises, moreover, the main switch 30 is turned off.

Figure 4:
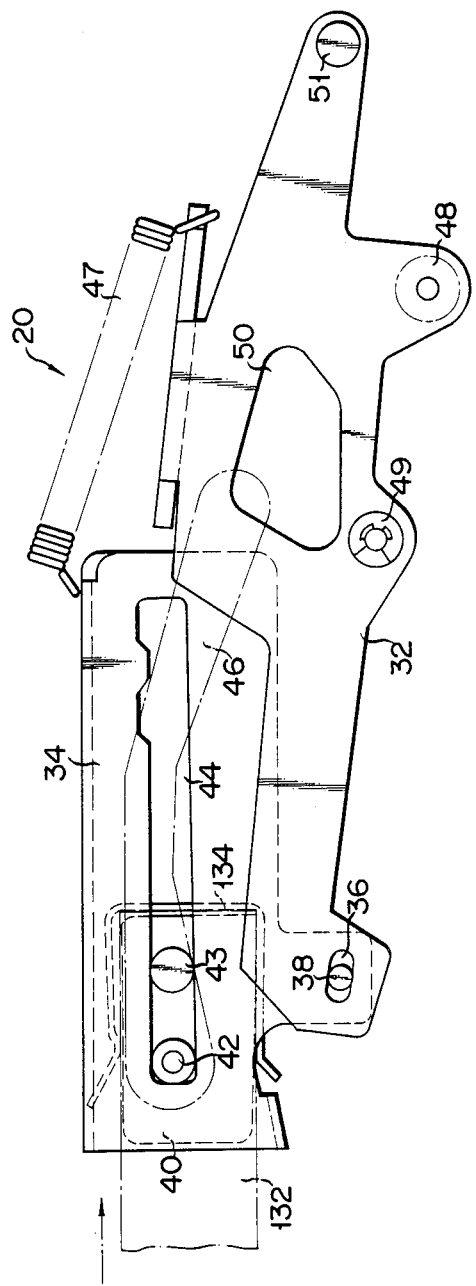

Now individual components or members will be described in detail. As shown in FIGS. 3 and 4, the cassette holder 20 comprises a holder support 32 rockingly supported by the guide plates 16 and 18, and a holder body 34 swingably supported by the holder support 32 to move up and down as the holder support 32 rocks. The holder body 34 has guide pins 38 and 127, which are loosely fitted in guide slots 36 and 129, respectively, formed in the holder support 32, and are projected outward through the guide slots 36 and 129. Further, the holder body 34 has a guide pin 126 vertically aligned with the guide pin 127, and contains a slider 40 therein. The slider 40 has outwardly protruding guide pins 42 and 43, which are fitted in a horizontally extending guide slot 44 in the holder body 34. Thus, the slider 40 is allowed to slide horizontally along the guide slot 44 inside the holder body 34. The guide pin 42 of the slider 40 is projected outward through the guide slot 44. One end portion of a coupling arm 46 which is disposed between the cassette holder 20 and the guide plate 16 is rockingly fitted with the guide pin 42. The holder support 32 has a guide roller 49 rockingly attached thereto and protruding outward therefrom. The guide roller 49 constitutes a guide member in this invention. Also, the holder support 32 has a rectangular opening 50 and a pin 51 protruding outward from the rear end portion of the holder support 32. The pin 51 shifts the main switch 30 (see FIG. 2) as the holder support 32 rocks. The holder support 32 is rockingly attached to the guide plates 16 and 18 by means of rocking pins 48 and 128. The holder support 32 is urged downward or in the counterclockwise direction as in FIG. 4 by a tension spring 47 stretched between the holder support 32 and the guide plate 16 and another tension spring 130 stretched between the holder support 32 and the guide plate 18.

Figure 5:
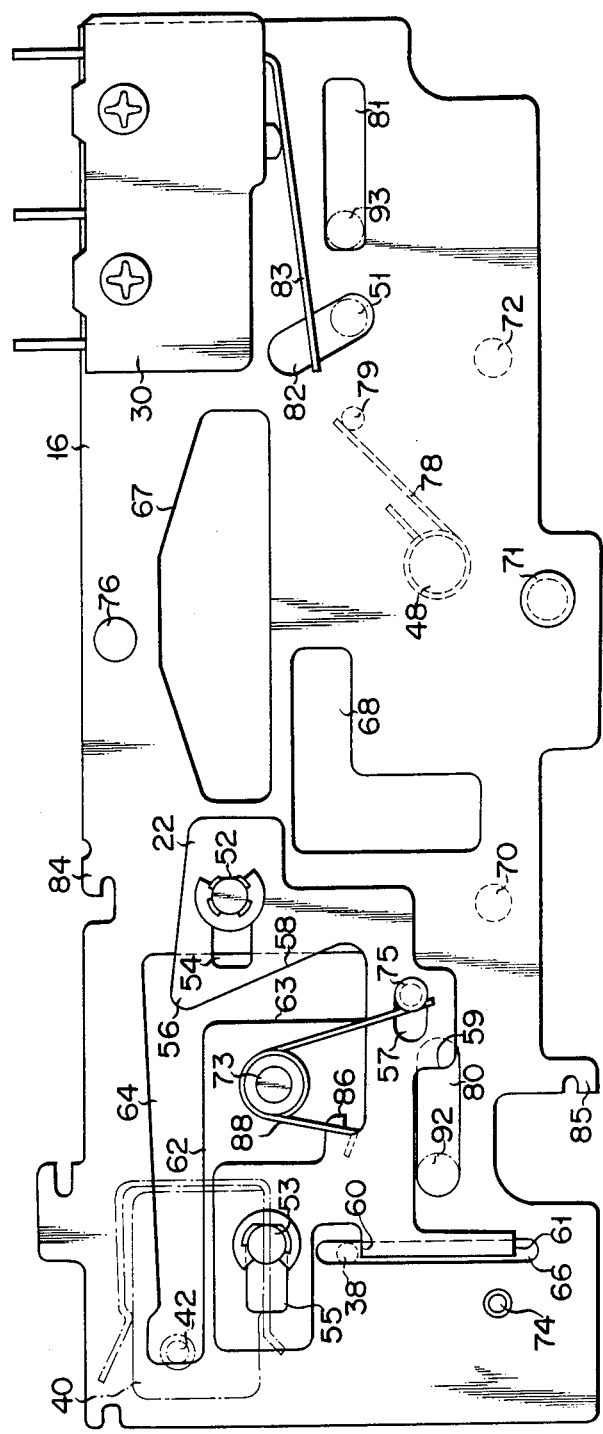

As shown in FIG. 5, the guide plate 16 is provided with a subtantially L-shaped guide hole 64 in which the guide pin 42 of the slider 40 is inserted, and a vertically extending guide slot 66 in which the guide pin 38 of the holder body 34 is inserted. The guide hole 64 has a horizontally extending slide guide surface 62 to support the guide pin 42, and a vertically extending ascent-and-descent guide surface 63 continuous with the slide guide surface 62. The guide plate 16 is further provided with a pentagonal opening 67 and an L-shaped opening 68. A pin 120 (mentioned later) coupling the coupling arm 46 and a coupling plate 116 moves within the opening 67, while the guide roller 49 of the holder support 32 and a push pin 95 (mentioned later) of the ejecting plate 24 move within the opening 68. The guide plate 16 has inwardly protruding guide pins 70, 71 and 72 to support the boosting plate 26; the guide pin 71 also protrudes outwardly. Further, the guide plate 16 has guide pins 52, 53 and 75 to support the lock plate 22, guide pins 73 and 74 to support the ejecting plate 24, and a spring peg pin 76; all of these pins protrude outwardly from the guide plate 16. Attached to the inner surface of the guide plate 16 is the rocking pin 48 which rockingly supports the holder support 32 and the stop member 28. The rocking pin 48 is wound with a torsion spring 78, one end of which is stoped by a stop pin 79 protruding inward from the guide plate 16. Moreover, the guide plate 16 has horizontally extending guide slots 80 and 81 to support the ejecting plate 24 and an obliquely extending guide slot 82 in which the pin 51 of the holder support 32 is inserted. The main switch 30 is attached to the outer surface of the rear end portion of the guide plate 16. The main switch 30 has an operating strip 83 capable of engaging the pin 51. Spring peg strips 84 and 85 are formed on the upper and lower edges of the guide plate 16, respectively.

Meanwhile, the guide plate 16 is provided with the lock plate 22, which has horizontally extending guide slots 54, 55 and 57 supported by the guide pins 52, 53 and 75, respectively, of the guide plate 16; these pins 52, 53 75 are attached to the outer surface of the guide plate 16 so as to be horizontally slidable. Also, the lock plate 22 has an upper end portion 56 capable of engaging the guide pin 42 of the slider 40, and a guide surface 58 extending downward from the upper end portion 56 to guide the guide pin 42 in movement. The lock plate 22 is further provided with a pair of holding cams 60 and 61 vertically separated from each other. The holding cams 60 and 61 are so designed as to be able to engage the guide pin 38 of the holder body 34, thereby regulating the up-and-down motion of the cassette holder 20. If the guide pin 38 engages the holding cam 60, the cassette holder 20 is locked to its upper position. If the guide pin 38 engages the holding cam 61, on the other hand, the cassette holder 20 is locked to its lower position. Further, the lock plate 22 has a shoulder portion 59 capable of engaging a guide pin 92 of the ejecting plate 24, and a spring peg strip 86 stopping one end of a torsion spring 88 wound on the guide pin 73. Thus, the lock plate 22 is urged to the left by the torsion spring 88. The other end of the torsion spring 88 is stopped by the guide pin 75.

Figure 6:
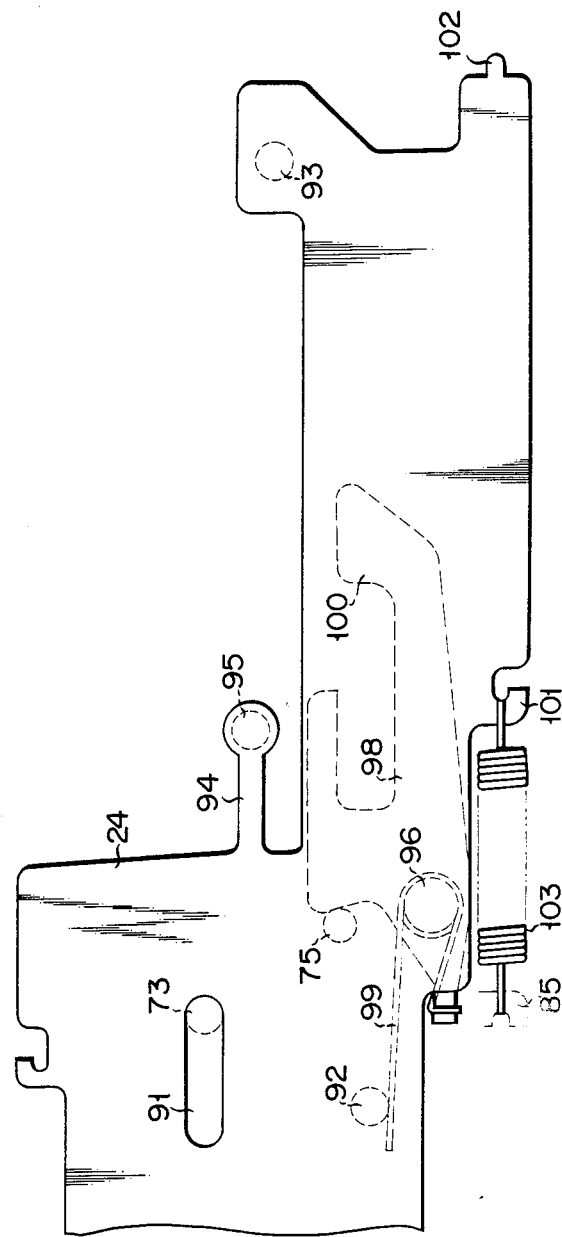
Figure 7:
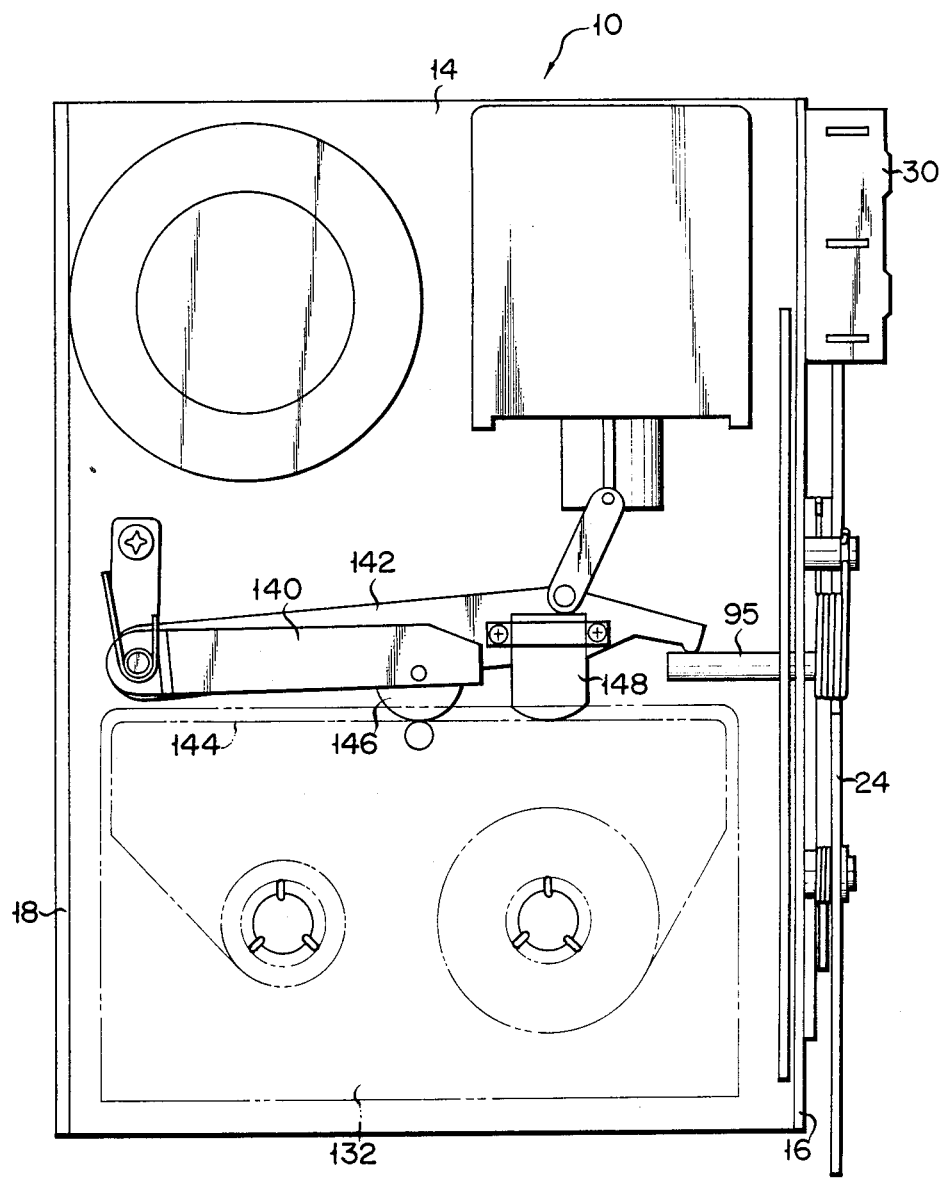
FIG. 7 is a plan view schematically showing the cassette tape recorder.

As shown in FIG. 6, the ejecting plate 24 is provided with a horizontally extending guide slot 91 supported by the guide pin 73 of the guide plate 16, and guide pins 92 and 93 supported by the guide slots 80 and 81 of the guide plate 16, respectively. The guide pins 92 and 93 protrude inwardly from the ejecting plate 24, and the guide pin 92 penetrates the guide slot 80 of the guide plate 16 to be projected inside the guide plate 16. Also, the ejecting plate 24 has a projected portion 94 horizontally extending therefrom. The push pin 95 protrudes inwardly from the projected end of the projected portion 94. The push pin 95 penetrates the respective openings 68 and 50 of the guide plate 16 and the holder support 32 to be projected fully inward. As seen from FIG. 7, when the ejecting plate 24 is pushed in, the push pin 95 presses and rocks a pinch roller lever 140 and a head lever 142 rockingly attached to the base 14, thereby separating a pinch roller 146 and a head 148 from a magnetic tape 144 in a cassette 132. The push pin 95 constitutes a pressing means in this invention. The ejecting plate 24 has an inwardly protruding pin 96 to which a swinging strip 98 is rockingly attached. The pin 96 is wound with a torsion spring 99, one and the other ends of which are stopped by the guide pin 92 and the rear end of the swinging strip 98, respectively. The swinging strip 98 has an engaging claw 100 capable of engaging an engaging pin 118 (mentioned later) of the coupling plate 116, and is urged by the torsion spring 99 to rock counterclockwise around the pin 96 to come into contact with the spring peg pin 75 of the guide plate 16. Spring peg strips 101 and 102 are formed on the lower and right edges of the ejecting plate 24, respectively. The ejecting plate 24 is urged to the left by a tension spring 103 which is stretched between the spring peg strip 101 and the spring peg strip 85 of the guide plate 16.

Figure 8:
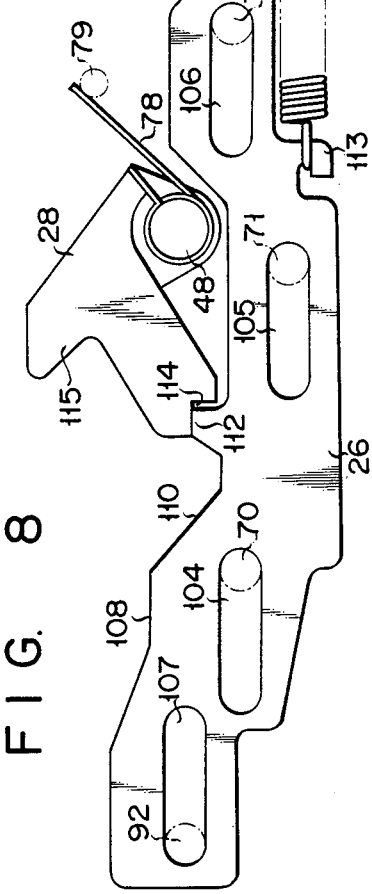

As shown in FIG. 8, the boosting plate 26 is provided with horizontally extending guide slots 104, 105 and 106 supported by the guide pins 70, 71 and 72 of the guide plate 16, and a horizontally extending guide slot 107 supported by the guide pin 92 of the ejecting plate 24, and is slidably attached to the inner surface of the guide plate 16 between the cassette holder 20 and the guide plate 16. Further, the boosting plate 26 has horizontal and slant guide surfaces 108 and 110 capable of engaging the guide roller 49 of the holder support 32. Moreover, the boosting plate 26 has an engaging portion 112 on its upper edge and a spring peg strip 113 on its lower edge. A tension spring 121 is stretched between the spring peg strip 113 and the spring peg strip 102 of the ejecting plate 24. As mentioned later, the tension spring 121 urges the boosting plate 26 to the right when the ejecting plate 24 is pushed in from the first position. The tension spring 121 constitutes urging means in this invention.

As shown in FIG. 8, the stop member 28 has a stopper 114 capable of engaging the portion 112 of the boosting plate 26, and a contact portion 115 capable of coming into contact with the push pin 95. The stop member 28 is rockingly supported inside the guide plate 16 and over the boosting plate 26 by the rocking pin 48. Further, the stop member 28 is urged to rock counterclockwise around the rocking pin 48 by the torsion spring 78 wound on the rocking pin 48. Thus, the stopper 114 of the stop member 28 engages the engaging portion 112 of the boosting plate 26 to prevent the boosting plate 26 from sliding to the right.

Figure 9:
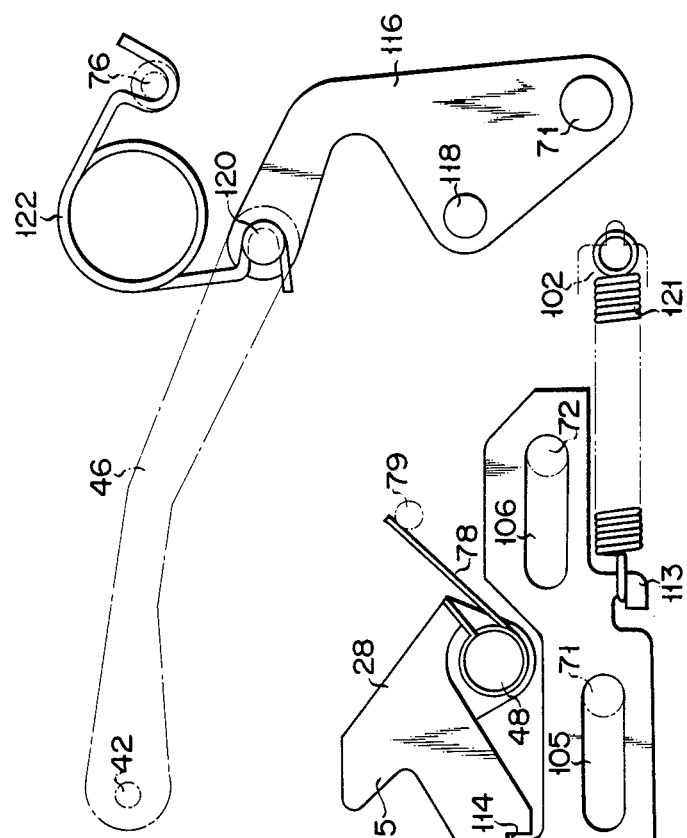

The coupling plate 116 shown in FIG. 9 is rockingly attached by the guide pin 71 to the guide plate 16 between the guide plate 16 and the ejecting plate 24. The coupling plate 116 has the outwardly protruding engaging pin 118, which can engage the engaging claw 100 of the swinging strip 98 attached to the ejecting plate 24. Moreover, the coupling plate 116 has the pin 120 protruding outwardly and inwardly, and is urged to rock counterclockwise around the guide pin 71 by a torsion spring 122 held between the pin 120 and the spring peg pin 76 of the guide plate 16. The pin 120 penetrates the opening 67 of the guide plate 16, and is coupled to the other end of the coupling arm 46. One and the other ends of the coupling arm 46 are rockingly supported by the guide pin 42 of the slider 40 and the pin 120 of the coupling plate 116, respectively.

As shown in FIG. 3, moreover, the guide plate 18 has a pair of vertically extending guide slots 124 and 125 in which the guide pins 126 and 127 of the holder body 34 are fitted, respectively.

There will now be described the operation of the cassette tape recorder 12 of the above-mentioned construction.

In FIG. 2, the ejecting plate 24 is urged to the left by the tension spring 103 to be located in the first position. The lock plate 22 is urged to the left by the torsion spring 88 wound on the guide pin 73. The guide pin 42 of the slider 40 is supported by the slide guide surface 62 of the guide hole 64, and the guide pin 38 of the holder body 34 is stopped and locked by the holding cam 60 of the lock plate 22. Thus, the cassette holder 20 is held in the upper position shown in FIG. 2. The holder support 32 is urged by the tension springs 47 and 130 to rock around the rocking pins 48 and 128 in the counterclockwise direction, that is, in the direction to lower the cassette holder 20. The coupling plate 116 is urged by the torsion spring 122 to rock counterclockwise around the guide pin 71. The urging force of the torsion spring 122 is transmitted to the guide pin 42 of the slider 40 through the pin 120 and the coupling arm 46. Accordingly, the slider 40 is moved until the guide pin 42 is brought into contact with the left end of the guide hole 64. Before cassette insertion, the main switch 30 is off. Only part of the cassette holder 20 is shown in FIG. 2 for simplicity of illustration.

In the cassette tape recorder 12 shown in FIG. 2, a cassette 132 is inserted into the cassette holder 34 in the direction indicated by the arrow of FIG. 4, and is pushed in without resistance until its forward end comes into contact with a stop strip 134 of the slider 40. Thereafter, if the cassette 132 is further pushed in, the slider 40 and the coupling arm 46 are moved to the right against the urging force of the torsion spring 122 on the coupling plate 116 acting on the coupling arm 46. As the slider 40 and the coupling arm 46 move to the right, the coupling plate 116 rocks clockwise around the guide pin 71. Hereupon, the torsion spring 122 acts so as to retard the clockwise rocking of the coupling plate 116. When the pin 120 passes a neutral line 136 of the torsion spring 122, however, the torsion spring 122 causes the coupling plate 116 instantaneously to rock clockwise. Accordingly, the slider 40 and the cassette 132 are automatically and instantaneously sucked into the holder body 34 by the urging force of the torsion spring 122, and the guide pin 43 is brought into contact with the right end of the guide slot 44 of the holder body 34 (see FIG. 4). Then, the guide pin 42 slides to the right, supported by the slide guide surface 62 of the guide hole 64, and comes into contact with the upper end portion 56 of the lock plate 22, thereby causing the lock plate 22 to slide to the right against the urging force of the torsion spring 88. As the lock plate 22 moves to the right, the guide pin 38 of the holder body 34 is disengaged from the holding cam 60. Accordingly, the holder support 32 is rocked counterclockwise around the rocking pins 48 and 128 by the urging force of the tension springs 47 and 130 to move automatically and instantaneously the holder body 34, along with the slider 40 and the cassette 132, from the upper position to the lower position. Then, the guide pin 38 of the holder body 34 descends along the guide slot 66 to reach its lower end. Further, the guide pin 42 of the slider 40 descends along the ascent-and-descent guide surface 63 until it comes into contact with the lower end of the guide hole 64. As the guide pin 42 descends, the lock plate 22 is moved to the left by the urging force of the torsion spring 88, the holding cam 61 engages the guide pin 38. Thus, the cassette holder 20 is locked to the lower position shown in FIG. 10. As the holder support 32 rocks counterclockwise, moreover, the pin 51 of the holder support 32 ascends inside the guide slot 82 to force up the operating strip 83, thereby turning the main switch 30 on. When the cassette holder 20 reaches the lower position, the head lever 142 and the pinch roller lever 140 move automatically to bring the head 148 and the pinch roller 146 thereon into contact with the magnetic tape 144 in the cassette 132 (see FIG. 7). Thus, playback operation is started automatically. Only part of the cassette holder 20 is shown in FIG. 10 for simplicity of illustration.

Figure 10:
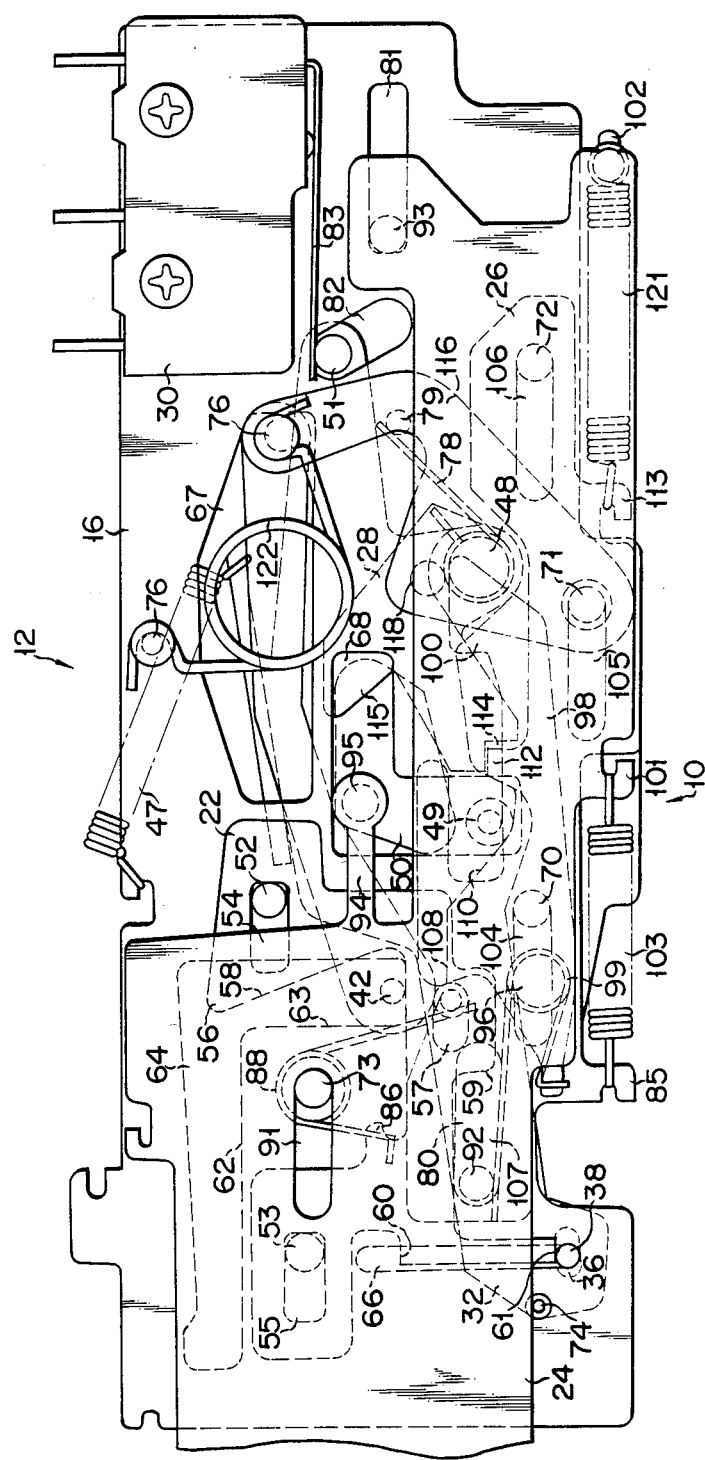
FIGS. 10 and 11 are right side views of the cassette tape recorder illustrating different operating modes thereof.

Referring now to FIG. 10 showing a playback mode, cassette ejection is performed by pushing in or moving the ejecting plate 24 to the right from the first position shown in FIG. 10. If the ejecting plate 24 is pushed in against the tensile force of the tension spring 103, it moves to the right, with its guide slot 91 guided by the guide pin 73 and its guide pins 92 and 93 guided by the guide slots 80 and 81, respectively. Thus, a push-in stroke of the ejecting plate 24 is started. Immediately after the start of the push-in stroke, the push pin 95 extending inwardly from the projected portion 94 of the ejecting plate 24 comes into contact with the head lever 142 (see FIG. 7). Then, if the ejecting plate 24 is further pushed in, the push pin 95 moves the pinch roller lever 140 and the head lever 142 away from the cassette 132, thereby separating the pinch roller 146 on the pinch roller lever 140 and the head 148 on the head lever 142 from the magnetic tape 144. In the push-in stroke of the ejecting plate 24, the boosting plate 26 is subjected to a rightward urging force by the tension spring 121 stretched between the respective spring pep strip 102 and 113 of the ejecting plate 24 and the boosting plate 26. Having its engaging portion 112 engaged with the stopper 114 of the stop member 28, however, the boosting plate 26 is prevented from sliding to the right by the stop member 28, and is kept in the first position shown in FIG. 10. As the ejecting plate 24 is pushed in, therefore, the tension spring 121 is charged with urging force. The moment the push pin 95 finishes moving the head 146 and the pinch roller 148 to the positions where they do not hinder the ascending motion of the cassette holder 20, that is, at the end of the push-in stroke of the ejecting plate 24, the guide pin 92 of the ejecting plate 24 comes into contact with the shoulder portion 59 of the lock plate 22, thereby causing the lock plate 22 to slide to the right against the urging force of the torsion spring 88. As the lock plate 22 slides to the right, the holding cam 61 is disengaged from the guide pin 38 to allow the ascent of the cassette holder 20. At the same time, the push pin 95 comes into contact with the contact portion 115 of the stop member 28 to rock the stop member 28 clockwise around the rocking pin 48 against the urging force of the torsion spring 78. Accordingly, the stopper 114 is disengaged from the engaging portion 112 of the boosting plate 26, so that the boosting plate 26 is urged to the right by the urging force with which the tension spring 121 is charged, and slides suddenly to the second position (see FIG. 11). As the boosting plate 26 slides to the right, the guide roller 49 of the holder support 32 rises along the slant guide surface 110 of the boosting plate 26 to be supported by the horizontal guide surface 108. Thus, the holder support 32, along with the holder body 34 and the cassette 132, is pushed up by the boosting plate 26. Then, the guide pin 38 of the holder body 34 ascends until it comes into contact with the upper end of the guide slot 66, and the guide pin 42 rises in the guide hole 64 to strike against the upper end portion 56 of the lock plate 22. Thus, the ascending motion of the cassette holder 20 is completed (see FIG. 11). As the holder support 32 rises or rocks clockwise around the rocking pin 48, the pin 51 moves downward in the guide slot 82. Accordingly, the operating strip 83 is lowered to turn the main switch 30 off. Further, the swinging strip 98 of the ejecting plate 24 is separated from the guide pin 75 by the push-in stroke of the ejecting plate 24, and is rocked counterclockwise around the pin 96 by the urging force of the torsion spring 99. Then, the engaging claw 100 of the swinging strip 98 engages the engaging pin 118 of the coupling plate 116 (see FIG. 11). Only part of the cassette holder 20 is shown in FIG. 11 for the simplicity of illustration.

Thus, the push-in stroke of the ejecting plate 24 need only be so set that the push pin 95 may move the head and pinch roller of the cassette tape recorder 12 to the positions where they do not hinder the ascending motion of the cassette holder 20. Moreover, the ascending motion of the cassette holder 20 is successively performed by the push-in stroke of the ejecting plate 24.

Figure 11:
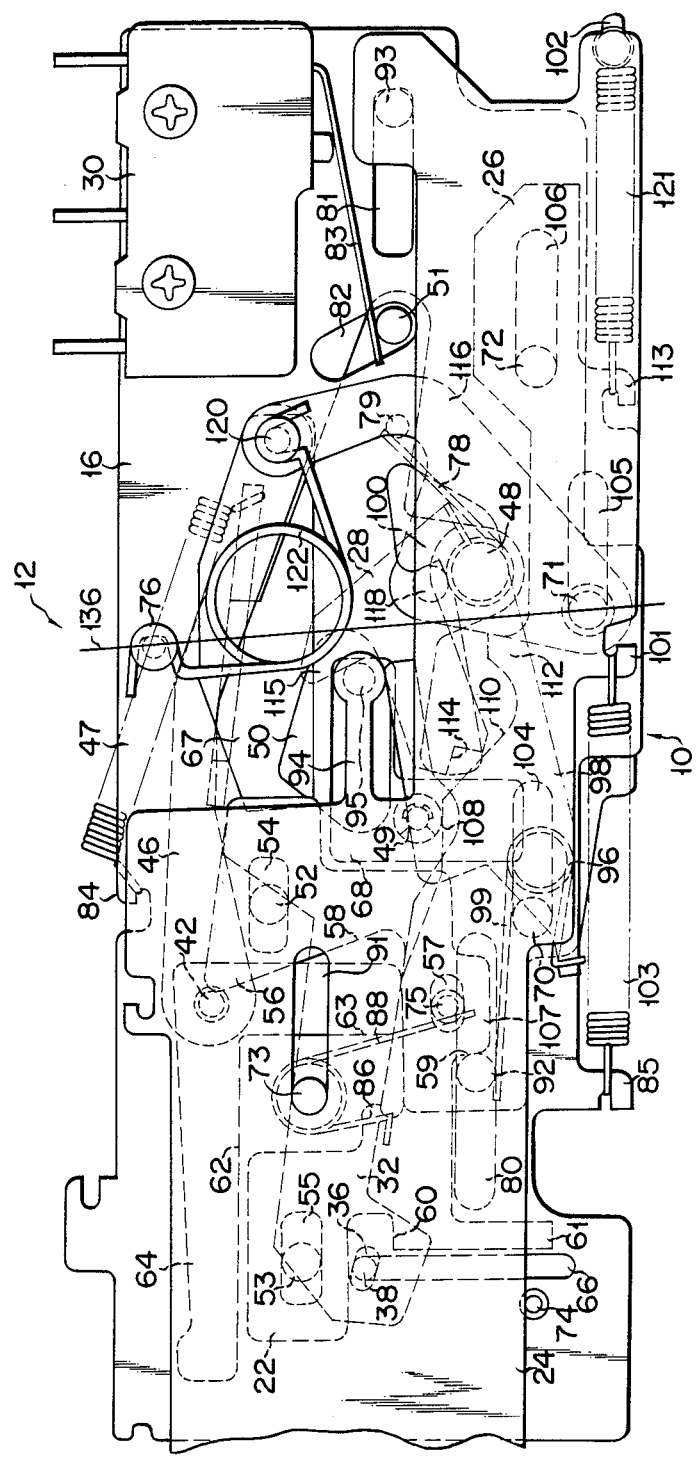

FIG. 11 shows a state in which the ejecting plate 24 is pushed in to its motion limit, that is, a state in which the ejecting plate 24 is located in the second position. In FIG. 11, if the pressing force on the ejecting plate 24 is removed, a return stroke of the ejecting plate 24 or movement thereof to the first position is started. At this time, the tension spring 103 is fully stretched to be fully charged with urging force. Accordingly, the ejecting plate 24 is moved to the left by the urging foce of the tension spring 103. Since the engaging claw 100 of the swinging strip 98 of the ejecting plate 24 is engaged with the engaging pin 118 of the coupling plate 116, the swinging strip 98 causes, by the agency of the return stroke of the ejecting plate 24, the coupling plate 116 to rock counterclockwise around the guide pin 71 against the urging force of the torsion spring 122. As the coupling plate 116 rotates counterclockwise, the guide pin 42 slides along the slide guide surface 62 of the guide hole 64 to the left with the aid of the pin 120 and the coupling arm 46. Then, the slider 40, along with the cassette 132, also slides in the holder body 34. When the pin 120 of the coupling plate 116 passes the neutral line 136, the torsion spring 122 produces an urging force to rock the coupling plate 116 counterclockwise. Accordingly, the coupling plate 116 suddenly rocks counterclockwise, so that the guide pin 42, along with the slider 40, suddenly slides to the left to strike against the left end of the guide hole 64. Then, the cassette 132, which has slid together with the slider 40 to the left in the holder body 34, is ejected. As the guide pin 42 slides to the left to be separated from the upper end portion 56 of the lock plate 22, and as the ejecting plate 24 moves to the left to separate the guide pin 92 from the shoulder portion 59, the lock plate 22 is moved to the left by the urging force of the torsion spring 88. Then, the holding cam 60 engages the guide pin 38 to lock the cassette holder 20 to its upper position. Further, the ejecting plate 24 returns to its first position, and thus the ejecting operation is completed.

What is claimed is:

1. A cassette ejection mechanism of a cassette tape recorder comprising a pair of guide plates facing each other, a cassette holder including a holder support rockingly attached to the guide plates and a holder body supported by the holder support, said cassette holder and holder body being movable between upper and lower positions between the guide plates and capable of housing a tape cassette therein, and a magnetic head and a pinch roller arranged movably to come into contact with a magnetic tape in a tape cassette in the cassette holder when the cassette holder is located in the lower position thereof, wherein a tape cassette located together with the cassette holder in the lower position of the cassette holder, along with the cassette holder, moves to the upper position of the cassette holder after the magnetic head and the pinch roller move to positions where the magnetic head and the pinch roller do not hinder the movement of the cassette holder, and then a tape cassette slides in the cassette holder to be ejected, and further comprising:

an ejecting plate attached to one of the guide plates to be movable between first and second positions, whereby the magnetic head and the pinch roller are moved to the positions where the magnetic head and the pinch roller do not hinder the movement of the cassette holder as the ejecting plate moves from the first position to the second position thereof, and whereby a tape cassette in the cassette holder is slid to be ejected as the ejecting plate moves from the second position to the first position;

a boosting plate attached to said one guide plate to be movable between first and second positions, whereby the cassette holder is moved from the lower position to the upper position thereof as the boosting plate moves from the first position to the second position thereof;

urging means stretched between the ejecting plate and the boosting plate, whereby the boosting plate is urged to move from the first position to the second position thereof as the ejecting plate moves from the first position to the second position thereof; and a stop member attached to said one guide plate for engaging the boosting plate, thereby locking the boosting plate in the first position thereof, said ejecting plate including pressing means for pressing the stop member to disengage the stop member from the boosting plate when the ejecting plate reaches the second position thereof.

2. A cassette ejection mechanism of a cassette tape recorder according to claim 1, which further comprises a slide means disposed inside the holder body for sliding together with a tape cassette, a coupling plate rockingly attached to said one guide plate and coupled to the slide means to rock as the slide means slides, and an urging member disposed between said one guide plate and the coupling plate to apply an urging force to the coupling plate in rocking motion, and wherein the ejecting plate includes a swinging strip which engages the coupling plate to rock the same against the urging force of the urging member as the ejecting plate moves from the second position to the first position thereof, thereby sliding a tape cassette together with the slide means and ejecting the tape cassette.

3. A cassette ejection mechanism of a cassette tape recorder according to claim 1, wherein said pressing means includes a pressing member for pressing the magnetic head and the pinch roller to move the same to the positions where the magnetic head and the pinch roller do not hinder the movement of the cassette holder as the ejecting plate moves from the first position to the second position thereof, and for pressing the stop member when the ejecting plate reaches the second position thereof.

4. A cassette ejection mechanism of a cassette tape recorder according to claim 3, which further comprises a guide member attached to the holder support, and wherein the boosting plate has a slant guide surface capable of engaging the guide member, the slant guide surface pressing the guide member to rock the holder support as the boosting plate moves from the first position to the second position thereof, thereby moving the holder body from the lower position to the upper position thereof.

5. A cassette ejection mechanism of a cassette tape recorder according to claim 3, wherein said boosting plate includes an engaging portion, and the stop member is rockingly attached to said one guide plate and includes a stopper for engaging the engaging portion of the boosting plate to lock the boosting plate in the first position thereof, and the stop member further includes a contact portion capable of coming into contact with the pressing means, so that the engaging portion of the boosting plate is disengaged from the stopper as the contact portion is pressed by the pressing member.

* * * * *